F. W. BATTERSHALL.
METHOD OF MAKING PHOTOGRAPHS.
APPLICATION FILED OCT. 23, 1909.
1,037,192.
Patented Sept. 3, 1912.
2 SHEETS—SHEET 1.
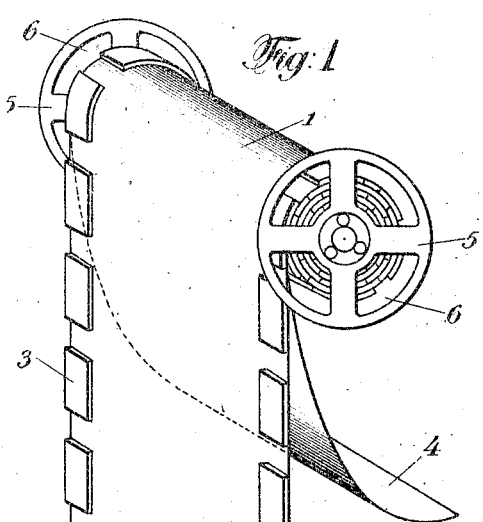
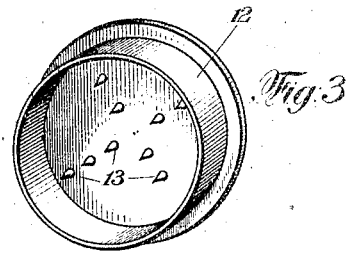
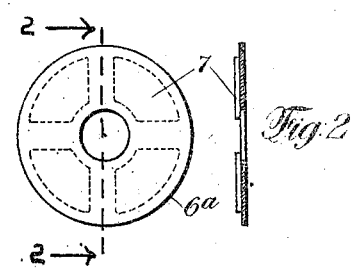
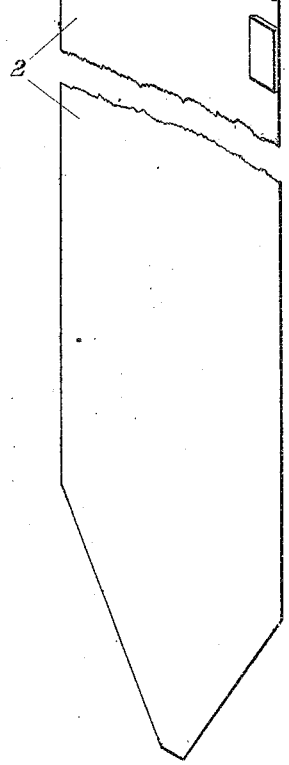
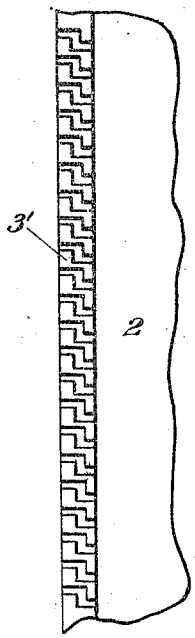
Witnesses
A. Newcomb
M. Meikle
Inventor
Fletcher W. Battershall
By his Attorneys
Prindle Dwight F. W. BATTERSHALL.
METHOD OF MAKING PHOTOGRAPHS.
APPLICATION FILED OCT. 23, 1909.
1,037,192.
Patented Sept. 3, 1912
2 SHEETS—SHEET 2.
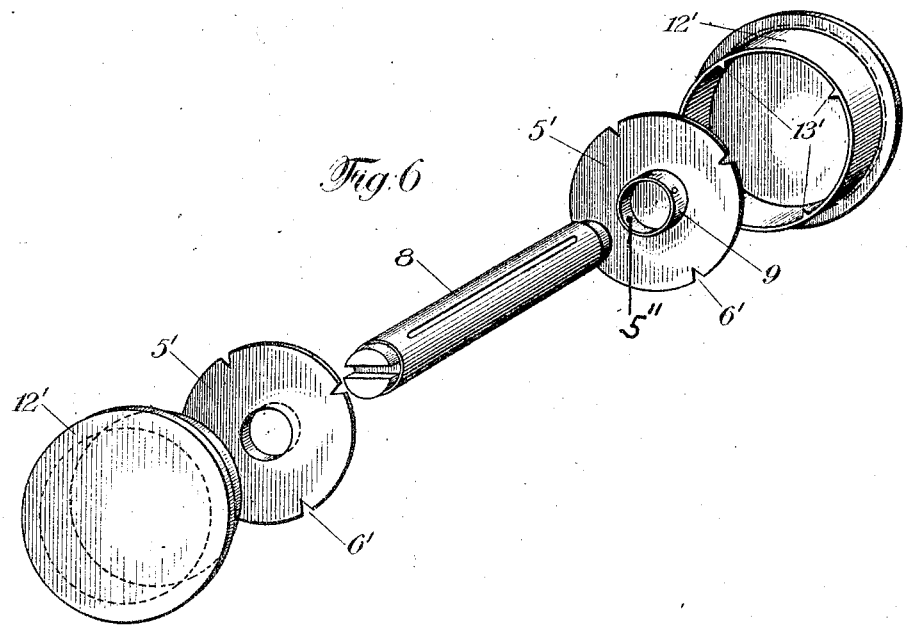
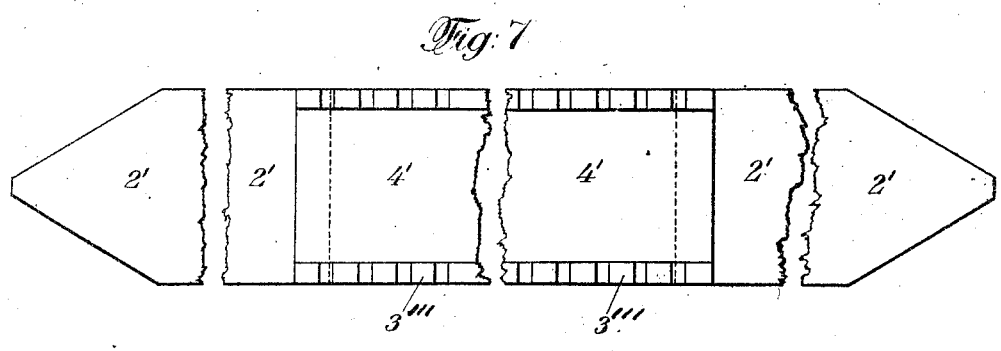

UNITED STATES PATENT OFFICE.

FLETCHER W. BATTERSHALL, OF ALBANY, NEW YORK.

METHOD OF MAKING PHOTOGRAPHS.

1,037,192.  Specification of Letters Patent.  Patented Sept. 3, 1912.

Application filed October 23, 1909. Serial No. 524,108.

*To all whom it may concern:*

Be it known that I, FLETCHER W. BATTERSHALL, of Albany, in the county of Albany and in the State of New York, have invented a certain new and useful Improvement in Methods of Making Photographs, and do hereby declare that the following is a full, clear, and exact description thereof.

The object of my invention is to render the development of photographic films more convenient, expeditious and inexpensive, and to enable said development to be carried on in the presence of actinic light at any time or place without the use of special apparatus.

Hitherto, the development of photographic films has been carried on by means of devices useful for that purpose only, so that photographers wishing to develop photographic films have found it necessary to provide special paraphernalia for that purpose. The older and more common form of photographic development required the use of a dark room illuminated only by nonactinic light, while the newer method of development, which may be carried on without using a dark room, requires special apparatus used solely for the purpose of development, thus increasing the number of accessories necessary, as well as the expense. Instead of using special apparatus for this purpose, I construct the light-tight receptacle which is used for holding the photographic film in such a manner that the film may be developed therein in daylight after the receptacle has been removed from the camera. By my improved method, on the other hand, I am enabled to develop a roll of film while carried upon the spool which is used for supporting it in making the photographic exposures in the camera. In other words, in developing a roll of film according to my improved process, it is merely necessary to remove a roll of film from the camera and insert it immediately in developing baths without any change whatever.

I have shown two different forms of apparatus by means of which my improved method may be carried out in the accompanying drawings, in which:

Figure 1 is a perspective view of a spool carrying a sensitized film and an opaque strip; Fig. 2 comprises an end elevation and a vertical cross-section of a light-tight closure for the ends of the spool the vertical cross-section being taken on the cross-section line 2—2 indicated in the end elevation; Fig. 3 is a perspective view of a cup-shaped member used for detaching the light-tight closure shown in Fig. 2; Fig. 4 is an elevational view of one modification of the means used for spacing the sensitized surface away from the adjacent surfaces; Fig. 5 comprises a front elevational view and a side elevational view of another modification of said means; Fig. 6 shows a perspective view of a spool having detachable flanges and cup-shaped members used for detaching the flanges upon the spool; and Fig. 7 shows a plan view of a sensitized film having the spacing means attached directly to said film, said film being provided at its ends with strips of opaque material to effectively exclude the light when the film has been completely wound up upon the spool.

In the drawings, 1 is a roll carrying an opaque strip 2, which is provided along its edges with a plurality of spaced projections 3, the object of which is to maintain the sensitized surface of a strip of film 4 out of contact with the adjacent surface of the opaque strip 2. The spool is also provided on its ends with circular flanges 5, which flanges contain a plurality of apertures 6.

When the spool is being used for obtaining photographic exposures, light-tight closures 6ª are applied to the outside of each of the flanges 5, said closures being provided with a plurality of bosses 7 of the same shape and size as the apertures 6 in the flanges 5. The bosses 7 are preferably also of the same thickness as the thickness of the flanges 5, so that when the closures 6ª are applied to the ends of the flanges 5, the apertures 6 are completely closed and the surfaces of the bosses lie in the same planes as the inner faces of the flanges 5, thereby absolutely preventing the access of any light to the sensitized surface of the film between the convolutions thereof. The light-tight closures 6ª may be constructed of any suitable easily frangible material, but preferably I construct them of opaque paper.

In order to break or remove the light-tight closures 6ª when it is desired to develop the film, I provide a pair of cup-shaped members 12, each of which is designed to be applied over one of the flanges 5. The inner faces of the cup-shaped members 12 have attached thereto a number of spines 13, the purpose of which is to engage and remove the closures 6ª.

In Figs. 4 and 5, I have shown two other modifications of the spaced projections. In Fig. 4 the projections 3' are so constructed that the various projections are separated by tortuous passages, so as to prevent the access of light between the convolutions of the films. In Fig. 5 still another modification is shown in which the spaced projections 3'' are wedge-shaped instead of flat, as shown in Fig. 1.

In Fig. 6 I have shown another modification of my device in which, instead of providing means for admitting the developing liquids through the surfaces of the flanges, I provide means for entirely detaching or partially displacing the flanges. It is a well-known fact that the flanges ordinarily provided upon the ends of spools for photographic films are attached to the ends of the central rods 8 merely by one or more slight indentations 5'' in the hub 9 of the flange 5'. The purpose of this modification of my apparatus is to detach or displace these flanges, and in order to accomplish this purpose, I provide a pair of cup-shaped members 12' having inwardly projecting teeth 13', which are designed to pass over the edges of the flanges and firmly grip the same, so that by pulling outwardly said flanges may be loosened or removed. The flanges 5' are provided with notches 6' to permit the passage of the teeth 13' over the edges of the flanges.

In Fig. 7 I have shown a different method of applying the spaced projections. In this modification the projections 3''' are applied directly to the surface of the film 4', and the ends of the film are provided with extensions 2' made of flexible material.

In the operation of my method with the aid of apparatus shown in Figs. 1, 2 and 3, a series of photographic exposures are made by inserting the spool 1 carrying the light-tight closures 6ª, into a camera, and completing the exposure in the usual manner. When the exposures are completed and the roll of film is entirely wound upon the spool, the spool is removed from the camera and the cup-shaped members 12' are applied to the flanges 5 of the spool. By causing the spines 13 to engage the light-tight closures 6ª, the latter can now be loosened or removed, it being understood that the cup-shaped members 12' are not removed from but are continually maintained over the flanges 5. The spool of film thus prepared can now be inserted in a bath of developing liquid. By moving the film backwardly and forwardly, the liquid can now be caused to enter between the convolutions of the film until the development is complete. The application of other liquids is accomplished in a similar manner until the film is entirely developed and fixed.

In case the modification of the spaced projections, shown in Fig. 4, is used, the light-tight closures 6ª and cups 12' can be completely dispensed with, inasmuch as no light can enter through the passages between the projections 3. The light-tight closures 6ª and the cups 12' may, however, be used as a safeguard, if desired.

In carrying out my method in connection with the modification shown in Fig. 6, the steps are the same except that instead of loosening or removing the light-tight closures 6ª, the flanges 5' themselves are loosened or removed, so as to permit access of the various liquids to the sensitized surface of the film.

The modification of the film shown in Fig. 7 may be used in my method when operated in connection with the apparatus shown in Figs. 1, 2 and 3, or the modification shown in Fig. 6.

While I have described my invention above in detail, I wish it to be understood that many changes may be made therein without departing from the spirit thereof.

I claim:

1. The method which comprises exposing and rerolling with separated convolutions a roll of film in a camera and developing said roll of film before unwinding it after leaving the camera.

2. The method which comprises rolling together upon a spool a strip of film and means to separate the convolutions of the film, exposing the film and rewinding the film and separating means in a camera and developing said roll of film before unwinding it after leaving the camera.

3. The method which comprises rolling together upon a spool a strip of film and means to separate the convolutions of the film, but to exclude light, exposing the film and rewinding the film and separating means in a camera, removing said roll from the camera and developing said roll of film in actinic light before unwinding it after leaving the camera.

In testimony that I claim the foregoing I have hereunto set my hand.

FLETCHER W. BATTERSHALL.

Witnesses:
ALEXANDER T. SELKIRK,
ANNA T. WANSBORO.